United States Patent
Chiang et al.

(10) Patent No.: US 10,635,321 B2
(45) Date of Patent: Apr. 28, 2020

(54) REDUCING A DATA STORAGE DEVICE READYING TIME

(71) Applicant: Seagate Technology LLC, Cupertino, CA (US)

(72) Inventors: Lim Choo Chiang, Singapore (SG); Ooi Eng Kuan, Singapore (SG); Chng Yong Peng, Singapore (SG); HanSing Ling, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 73 days.

(21) Appl. No.: 16/025,598

(22) Filed: Jul. 2, 2018

(65) Prior Publication Data

US 2020/0004431 A1    Jan. 2, 2020

(51) Int. Cl.
*G06F 3/06* (2006.01)
*G06F 12/0802* (2016.01)
*G06F 11/07* (2006.01)

(52) U.S. Cl.
CPC ............ *G06F 3/0611* (2013.01); *G06F 3/068* (2013.01); *G06F 3/0631* (2013.01); *G06F 3/0653* (2013.01); *G06F 3/0656* (2013.01); *G06F 12/0802* (2013.01); *G06F 11/073* (2013.01); *G06F 2212/1024* (2013.01)

(58) Field of Classification Search
CPC .... G06F 3/0611; G06F 3/0631; G06F 3/0653; G06F 3/0656; G06F 3/068; G06F 12/0802; G06F 11/073; G06F 2212/1024
See application file for complete search history.

(56) References Cited

U.S. PATENT DOCUMENTS

| | | | |
|---|---|---|---|
| 6,493,656 B1 | 12/2002 | Houston et al. | |
| 6,600,614 B2 | 7/2003 | Lenny et al. | |
| 6,950,255 B2 | 9/2005 | Lmai | |
| 7,802,019 B2 | 9/2010 | Shu et al. | |
| 8,015,433 B2 | 9/2011 | Chu et al. | |
| 8,694,970 B2 | 4/2014 | Edgar et al. | |
| 8,843,781 B1* | 9/2014 | Chiang | G06F 11/0745 714/6.11 |
| 9,582,058 B2 | 2/2017 | Lucas et al. | |
| 2007/0038850 A1 | 2/2007 | Matthews et al. | |
| 2010/0287397 A1 | 11/2010 | Naor et al. | |
| 2012/0254120 A1* | 10/2012 | Fang | G06F 16/2379 707/648 |
| 2015/0317248 A1* | 11/2015 | Lamb | G06F 12/0871 711/118 |

* cited by examiner

*Primary Examiner* — Tracy A Warren
(74) *Attorney, Agent, or Firm* — Westman, Champlin & Koehler, P.A.

(57) ABSTRACT

A data storage device includes a first memory section with a reserved area having stored therein an event trigger log that includes a history of past logged events. The data storage device also includes a second memory section separate from the first memory section. The data storage further includes a controller that, upon power up of the data storage device and before the data storage device is ready to receive host commands, allocates a buffer in the second memory section for capturing new events. The controller postpones linking of any captured new events with the past logged events until at least after the data storage device is ready to receive the host commands.

20 Claims, 5 Drawing Sheets

| Timestamp 302 | Address 304 | Event/error code 306 | Temperature 308 |

FIG. 3

REDUCING A DATA STORAGE DEVICE READYING TIME

BACKGROUND

Data storage devices are typically included in systems having one or more host computers. Examples of data storage devices include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit.

SUMMARY

In one embodiment, a data storage device is provided. The data storage device includes a first memory section with a reserved area having stored therein an event trigger log that includes a history of past logged events. The data storage device also includes a second memory section separate from the first memory section. The data storage further includes a controller that, upon power up of the data storage device and before the data storage device is ready to receive host commands, allocates a buffer in the second memory section for capturing new events. The controller postpones linking of any captured new events with the past logged events until at least after the data storage device is ready to receive the host commands.

In another embodiment, a method is provided. The method includes storing, by a control circuit of a data storage device, an event trigger log including a history of past logged events of the data storage device in a reserved area included in a first memory section of the data storage device. The method also includes, upon power up of the data storage device and before the data storage device is ready to receive host commands, allocating a buffer in a second memory section, of the data storage device, for capturing new events in the data storage device. The method further includes postponing linking of any captured new events with the past logged events until at least after the data storage device is ready to receive the host commands.

In yet another embodiment, a data storage device is provided. The data storage device includes a system memory. The data storage also includes a controller that, upon power-on reset of the data storage device and before the data storage device is ready to receive host commands, allocates a buffer in the system memory for capturing new events. The controller links any captured new events with past logged events after the data storage device is ready to receive the host commands.

This summary is not intended to describe each disclosed embodiment or every implementation of the techniques for reducing a data storage device readying time described herein. Many other novel advantages, features, and relationships will become apparent as this description proceeds. The figures and the description that follow more particularly exemplify illustrative embodiments.

BRIEF DESCRIPTION OF THE DRAWINGS

FIG. 3 is a block diagram illustrating and example structure of an event trigger log entry in accordance with one embodiment.

DETAILED DESCRIPTION OF ILLUSTRATIVE EMBODIMENTS

Figure 1:
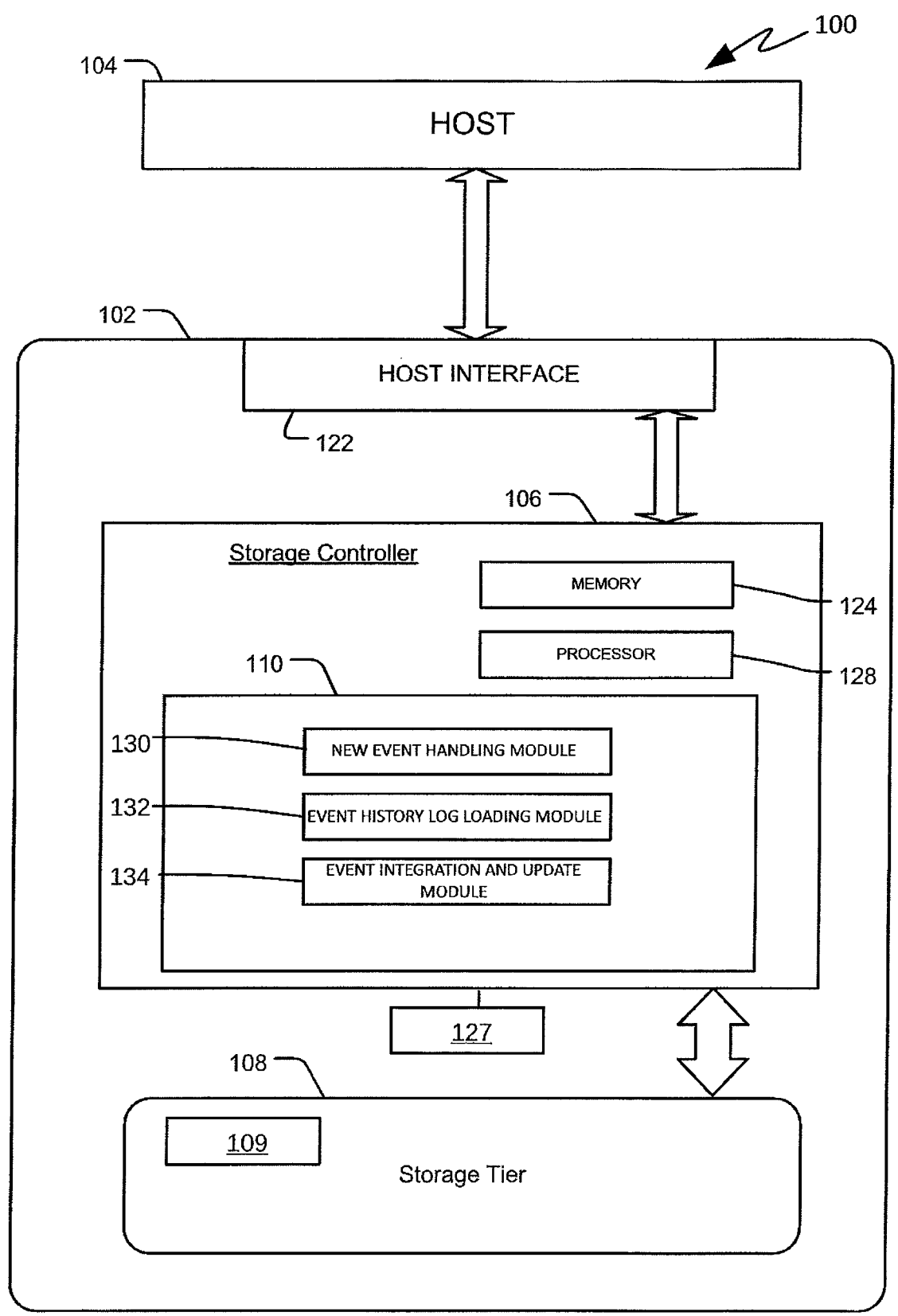
FIG. 1 is a block diagram of an example apparatus having a data storage device in accordance with one embodiment.

Embodiments of the disclosure generally relate to reducing a data storage device readying time.

Data Storage devices include a logging mechanism (e.g., an event trigger log) to capture device information when certain events (e.g., read/write failures) occur. The event trigger log may be used by the manufacturer to carry out failure analysis for the device failure in the field or data analysis on the drive behavior.

Conventional data storage devices load the event trigger log, including a history of past logged events, form a reserved memory area to a system buffer memory as part of the drive power up initialization. This is carried out because it enables immediate linking of any newly captured events with the previously logged events, thereby maintaining a single sequence of logged events. However, loading of past logged events at power up may impact the device initialization time or TTR (time to ready) especially when the size of the event trigger log is large (e.g., in high capacity devices and devices with complex designs including shingled magnetic (SMR), interlaced magnetic recording (IMR), etc.).

To help reduce TTR, embodiments of the disclosure postpone loading of the past logged events into the system buffer memory until at least after the data storage device is ready to receive host commands. In one embodiment, upon power up of the data storage device and before the data storage device is ready to receive host commands, a buffer is allocated in the system memory for capturing new events. The step of loading the past logged events into the system buffer memory is eliminated from the power-up sequence. Any captured new events in the buffer are linked with the past logged events at a later time (e.g., when the data storage device enters into an idle state). This reduces TTR. An example of a data storage device in which loading of the past logged events into a system buffer memory is postponed until at least after the device is ready to receive host commands is described below in connection with FIG. 1.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a block diagram of an example apparatus 100 that includes a data storage device 102 in accordance with one embodiment. Data storage device 102 includes a storage controller or control circuit 106 that communicatively couples a storage tier 108 to a host 104 via a host interface 122. In an implementation, the storage tier 108 is a dynamic storage tier. The storage controller 106 provides a mechanism to allow the host 104 to store data to and retrieve data from the storage tier 108. In an implementation, the storage tier 108 may be a main data store. The storage tier 108 may include without limitation one or more of magnetic data storage discs, optical data storage discs, non-volatile random access memory (RAM), such as NAND flash memory and a volatile RAM storage medium such as dynamic random access memory (DRAM). The storage tier 108 may include a reserved area 109 in which an event trigger log comprising a history of past logged events may be stored.

The storage controller 106 may utilize communication interfaces and protocols including SATA (serial advanced technology attachment), SCSI (small computer system interface), eSATA (external serial advanced technology attachment), SAS (serial attached SCSI), USB (universal serial bus), and others to communicate with the host 104 via the host interface 122. The storage controller 106 also includes an event management module 110, that includes program code having instructions to capture and log events in a manner that helps minimize TTR.

As can be seen in FIG. 1, the storage controller 106 also includes a memory 124 that may be used for storing data and/or one or more modules such as 110 in some embodiments. It should be noted that, in different embodiments, module 110 may comprise hardware, software and/or firmware. In one embodiment, the memory 124 may serve as a system memory in which a buffer may be allocated for capturing new events. In other embodiments, a separate memory or memory section 127 may serve as the system memory in which the buffer for capturing new events is allocated. The storage controller 106 further includes a processor 128. The processor 128 may perform functions of the storage controller 106 including functions disclosed herein as performed by module 110. The processor 128 may execute instructions stored on non-transitory computer readable media to perform the functions of the storage controller 106.

In one embodiment, module 110 may include multiple sub-modules. The sub-modules may include a new event handling module 130, an event history log loading module 132 and an event log integration and update module 134. Upon power-on reset of the data storage device 102 and before the data storage device 102 is ready for host commands, the new event handling module 130 allocates a buffer for capturing new events and helps store new events on the allocated buffer. The event history log loading module 132 enables loading of the event history log from the reserved area 109 into a buffer in the system memory any time after the data storage device 102 is ready for host commands (e.g., when the data storage device 102 enters a power saving mode (e.g., an idle state), when the host 104 requests event log information form the data storage device 102, before the data storage device is powered down, etc.).

The event log integration and update module 134 mergers the newly captured events with the event history log data and updates the reserved area 109 with the merged information.

Figure 2:
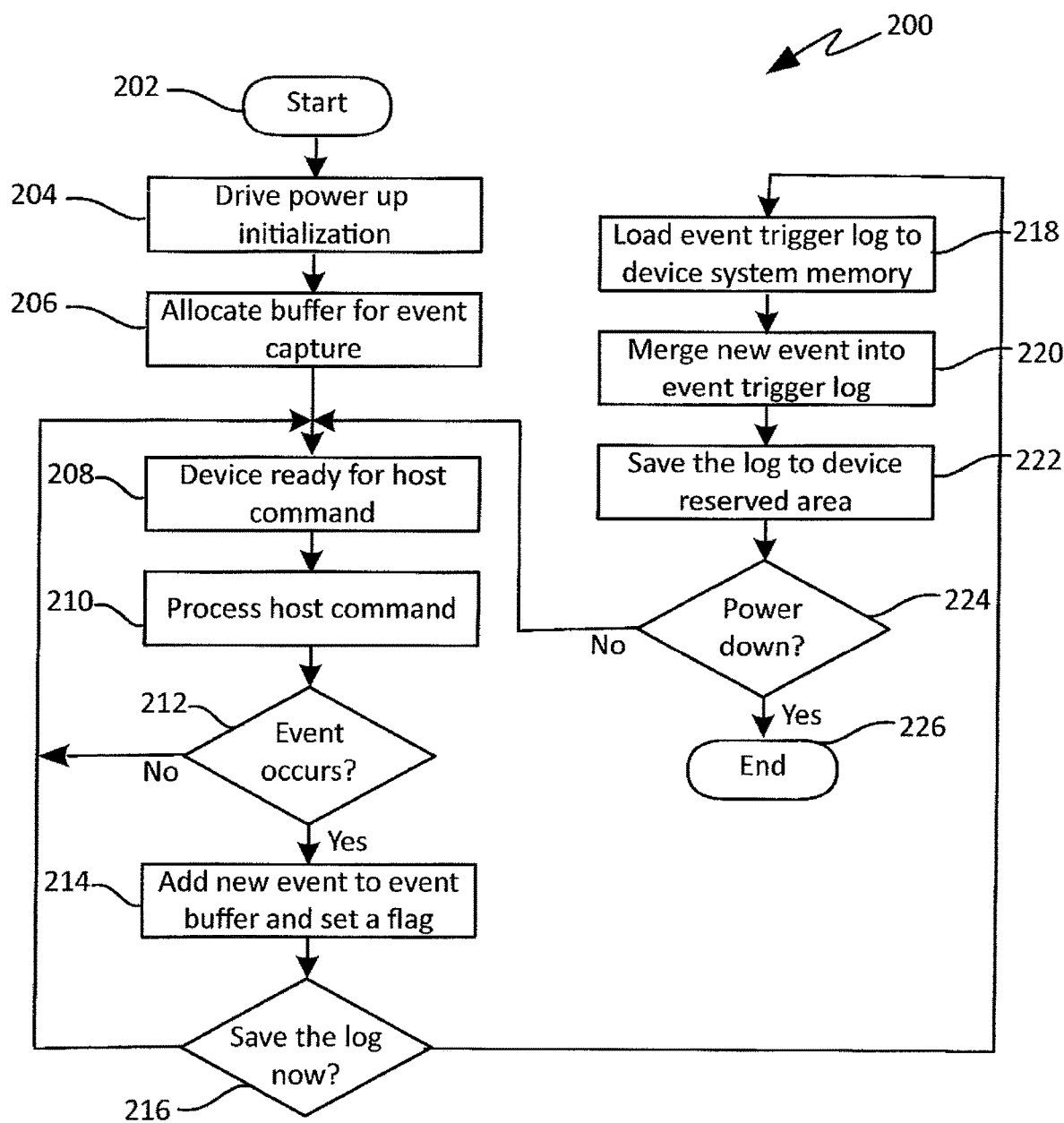
FIG. 2 is a flow diagram of a method of reducing a data storage device readying time in accordance with one embodiment.

FIG. 2 is a flowchart showing an event trigger logging method 200 carried out in a data storage device (such as 102 of FIG. 1) in accordance with one embodiment. The method starts at 202. At block 204, data storage device power up initialization is carried out. The device power up initialization may involve performing a sequence of operations that help the data storage device transition from a lower operational state (e.g., an "off" state) to a higher operational state. At block 206, a buffer is allocated to capture new events (e.g., future read/write operation failure events). Once the buffer is allocated, at block 208, the data storage device is ready to receive host commands (e.g., commands from host 104 of FIG. 1). At block 210, a host command (e.g., a read/write command received in the data storage from the host) is processed with the help of a control circuit/processor (such as 128 of FIG. 1). At block 212, a determination is made (e.g., by a control circuit or processor such as 128 of FIG. 1) as to whether the host command was properly processed (e.g., without errors) or whether an event (e.g., a command processing error) occurred. If no event occurred, control is returned to block 208. If an event occurred, at block 214, information related to the event is logged in the event buffer, which was allocated at block 206. Also, at block 214, if the logged event is a first event or initial event saved in the buffer, a new events flag is set (e.g., set to "1") in the event buffer. The new events flag may be set once in the event buffer to indicate (e.g., to controller circuit or processor 128 of FIG. 1) the presence of one or more new events in the event buffer, which have not been merged into the event history log.

As block 216, a decision is made as to whether the one or more new events logged in the event buffer should be saved (e.g., written to the reserved area 109 of FIG. 1). The decision to save the one or more new events logged in the event buffer may be made based on an operational state of the data storage device (e.g., when the data storage device is in an idle state), based on whether a command from the host requesting event log information form the data storage device is received in the device, or whether the data storage device is going to be powered down. If a decision not to save the one or more new events is made at block 216, control returns to block 208. If a decision to save the one or more new events is made at block 216, control passes to block 218. At block 218, an event history log is loaded from, for example, a reserved area (e.g., reserved area 109 of FIG. 1) into a system memory of the data storage device (e.g., memory 127 of FIG. 1). At block 220, the newly logged events are merged into the event history log. The may involving indexing the newly logged events to provide a proper time-ordered event sequence in the merged event history log. Upon merging the newly logged events into the event history log, the new events flag may be cleared (e.g., set to "0") in the event buffer to indicate that there are no pending new events to be merged. At block 222, the merged/updated event history log is saved into, for example, the reserved area (e.g., reserved area 109 of FIG. 1). At block 224, a determination is made as to whether the data storage device is to be powered down. If the data storage device is not to powered down, control passed to block 208. If the data storage device is to be powered down, the process ends at 226.

FIG. 3 is a block diagram illustrating and example structure of an event trigger log entry 300 in accordance with one embodiment. In the example of FIG. 3, event trigger log entry 300 includes a timestamp field 302, an address (e.g., logical block address (LBA)) field 304, an event/error code field 306 and a temperature field 308. It should be noted that the event trigger log fields in FIG. 3 are a non-limiting example and any suitable event trigger log entry 300 fields may be used in different embodiments. Timestamp filed 302 is used to store a time when an event/error occurs. Address field 304 is utilized to store a LBA associated with a location of the event/error. Event/error code field 306 is used to store a code that is associated with the event/error, and temperature field 308 is used to store a device temperature when the event/error occurs.

The following are a few simplified examples for event trigger logging:

1) Unrecoverable Disc Error (UDE) Detected

Here, the data storage device encounters a UDE while processing a read command. Upon encountering the UDE, the time at which the UDE occurred is stored in timestamp field 302, a location (e.g., LBA) at which the UDE occurred is stored in address field 304, an error code associated with UDE is stored in event/error code field 306 and the device temperature when the UDE occurred is stored in temperature field 308.

2) Large Shock Detected

Here, the data storage device encounters a relatively large shock when it is in operation. Upon detecting the shock, the time at which the large shock occurred is stored in the timestamp field 302. However, since the shock is at the device level, there is no specific location in the device associated with the shock. Thus, the address field 304 is not applicable. Similarly, the event/error code field 306 and the temperature field 308 and not applicable for the shock event.

3) IOEDC (Input/Output Error Detection and Correction Checksum) Error Detected

Here, data corruption along a data path is detected during a read or a write operation in the data storage device. Upon detecting the IOEDC error, the time at which the IOEDC error occurred is stored in timestamp field 302, a location (e.g., LBA) at which the IOEDC error occurred is stored in address field 304 and the device temperature when the error occurred is stored in temperature field 308. No event/error code is stored in field 306 for this event.

4) SMART (Self-Monitoring, Analysis and Reporting Technology) Trip

Here, a SMART trip is detected during operation of the data storage device. Upon detecting the SMART trip, a time at which the SMART trip occurred is stored in timestamp field 302, an attribute number that caused the trip is stored address field 304, an error code for the SMART trip is stored in event/error code field 306 and the device temperature when the SMART trip occurred is stored in temperature field 308.

Figure 4:
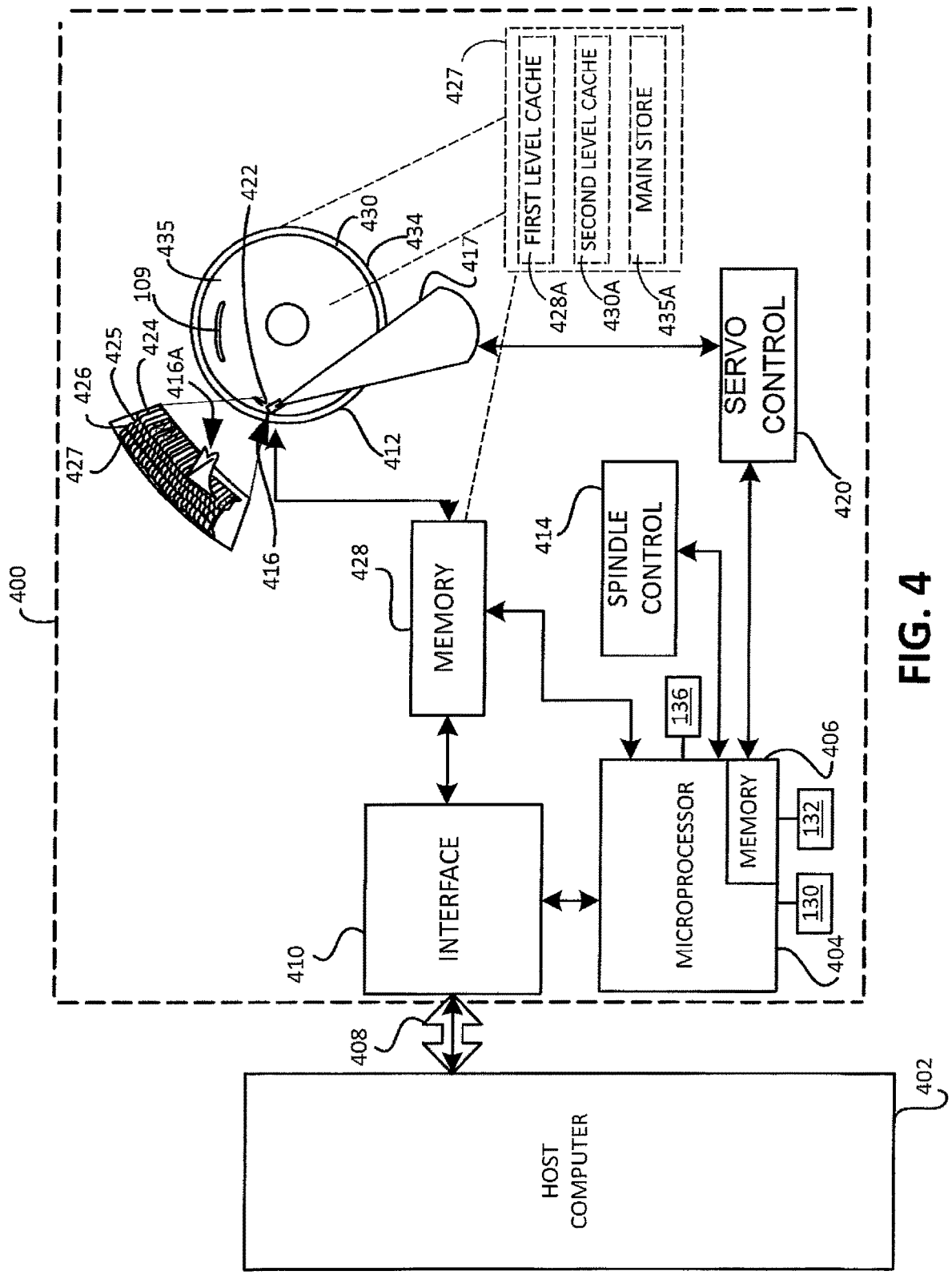
FIG. 4 is a block diagram of a hard disc drive that employs a method of reducing readying time in accordance with one embodiment.

FIG. 4 shows a block diagram of the disc drive 400 that employs a method of reducing readying time in accordance with one embodiment. Disc drive 400 is a particular example of a data storage device 102 (of FIG. 1). As will be described in detail further below, in one embodiment disc drive 400 employs one or more discs on which multiple data tracks may be written in a partially-overlapping shingled pattern, with each successive track overwriting a portion of the previous track. In another embodiment, disc drive 400 employs one or more discs on which no data tracks are written in a partially-overlapping shingled pattern.

Disc drive 400 is shown in FIG. 4 to be operably connected to a host computer 402 in which disc drive 400 may be mounted. Disc drive 400 includes a microprocessor system 404 that generally provides top level communication and control for disc drive 400 in conjunction with programming for microprocessor system 404 stored, for example, in microprocessor memory 406. Disc drive 400 may communicate with host computer 402 using a bus 408.

Memory 406 can include RAM, read only memory ROM, and other sources of resident memory for microprocessor 404. Disc drive 400 includes one or more data storage discs 412. Discs 412 are rotated at a substantially constant high speed by a spindle control circuit 414. One or more heads 416 communicate with the surface(s) of discs 412 to carry out data read/write operations. The radial position of heads 416 is controlled through the application of current to a coil in an actuator assembly 417. A servo control system 420 provides such control.

As noted above, in some embodiments, tracks may be written on one or more storage discs 412 in a partially-overlaying relationship. The overlaying of tracks is shown in close-up view of area 422 of disc(s) 412. In area 422, a corner of head 416A is shown writing a track portion 424. Different shading within the track portion 424 represents different magnetic orientations that correspond to different values of stored binary data. The track portion 424 is overlaid over part of track portion 425. Similarly, track portion 425 is overlaid over part of portion 426, portion 426 is overlaid over portion 427, etc.

The portions 424-427 may be part of what is referred to herein as a physical band which, in this embodiment, may include tens, hundreds or thousands of similarly overlapping, concentric portions 424-427. Gaps are created between such physical bands so that each physical band can be updated independently of other physical bands. The overlaying of successive track portions within a physical band in shingled magnetic recording (SMR) means that individual parts of the physical band may not be randomly updated on their own. This is because spacings between centers of track portions 424, 425, 426, 427, for example, are smaller than a width of a write pole (not separately shown) of head 416. However, a width of a reader (not separately shown) of head 416 may be small enough to read individual track portions 424, 425, 426, 427, thereby enabling random reads of data to be carried out.

In certain embodiments, disc drive 400 includes a memory 428 that may serve as, for example, a first/upper level cache denoted by reference numeral 428A. In some embodiments, memory 428 is physically separate from discs 412. The memory 428 may be of a different type than the discs 412. For example, in certain embodiments, memory 428 may be constructed from solid-state components. In one embodiment, memory 428 may be a Flash memory.

In some embodiments, the one or more storage discs 412 are managed as non-overlapping disc portion 430 and disc portion 435. In some embodiments, disc portion 430 is used for a second level cache denoted by reference numeral 430A and disc portion 435 serves as a main store denoted by reference numeral 435A. In an alternate embodiment, each of the first level cache 428A, the second level cache 430A and the main store 435A may be allocated from a pool of memory locations that includes, for example, storage locations from memory 428 and storage locations or physical bands from storage discs 412. Dashed box 427 of FIG. 4A indicates that, in the alternate embodiment, the entire set of storage locations that constitutes the storage space supplied by disc(s) 412 and memory 428 in disc drive 400 may be organized for three uses, namely the first level cache 428A, the second level cache 430A and main store 435A.

In the embodiment of FIG. 4A, disc drive 400 may use memory 428 in conjunction with disc portion 430 in order to manage data as the data is being transferred to main storage locations 435 on disc(s) 412. In the interest of simplification, components such as a read/write channel which encodes data and provides requisite write current signals to heads 416 is not shown in FIG. 4A. Also, any additional buffers that may be employed to assist in data transfer to the memory 428 and the main storage locations 435 are not shown in the interest of simplification.

As noted above, SMR may be used for storage in disc portion 430, which serves as second-level cache 430A. Also, as can be seen in FIG. 4A, main storage locations 435 are on a same data storage medium as the second-level cache locations 430. Thus, in the embodiment of FIG. 4A, second-level cache 430A is a media cache.

A SMR media cache such as 430A may rely on a high cleaning throughput to improve the host write throughput. As indicated above, in high capacity devices and devices with complex designs including SMR, an event trigger log/event history log stored in, for example, a reserved area 109 of portion 435 of disc 412 may be large. To help reduce TTR in disc drive 400, embodiments of the disclosure postpone loading of the past logged events from event trigger log/event history log stored in reserved area 109 into a system buffer memory (e.g., memory 428). This may be carried out by modules 130, 132 and 134 the may be part of microprocessor system 404 or may be separate components coupled to microprocessor system 404. Modules 130, 132 and 134 operate in a manner described above in connection with FIG. 1 and carry out TTR reduction operations in a manner described in connection with FIG. 1. Therefore, in the interest of brevity, a detailed description of modules 114 is not repeated in connection with FIG. 4.

Figure 5:
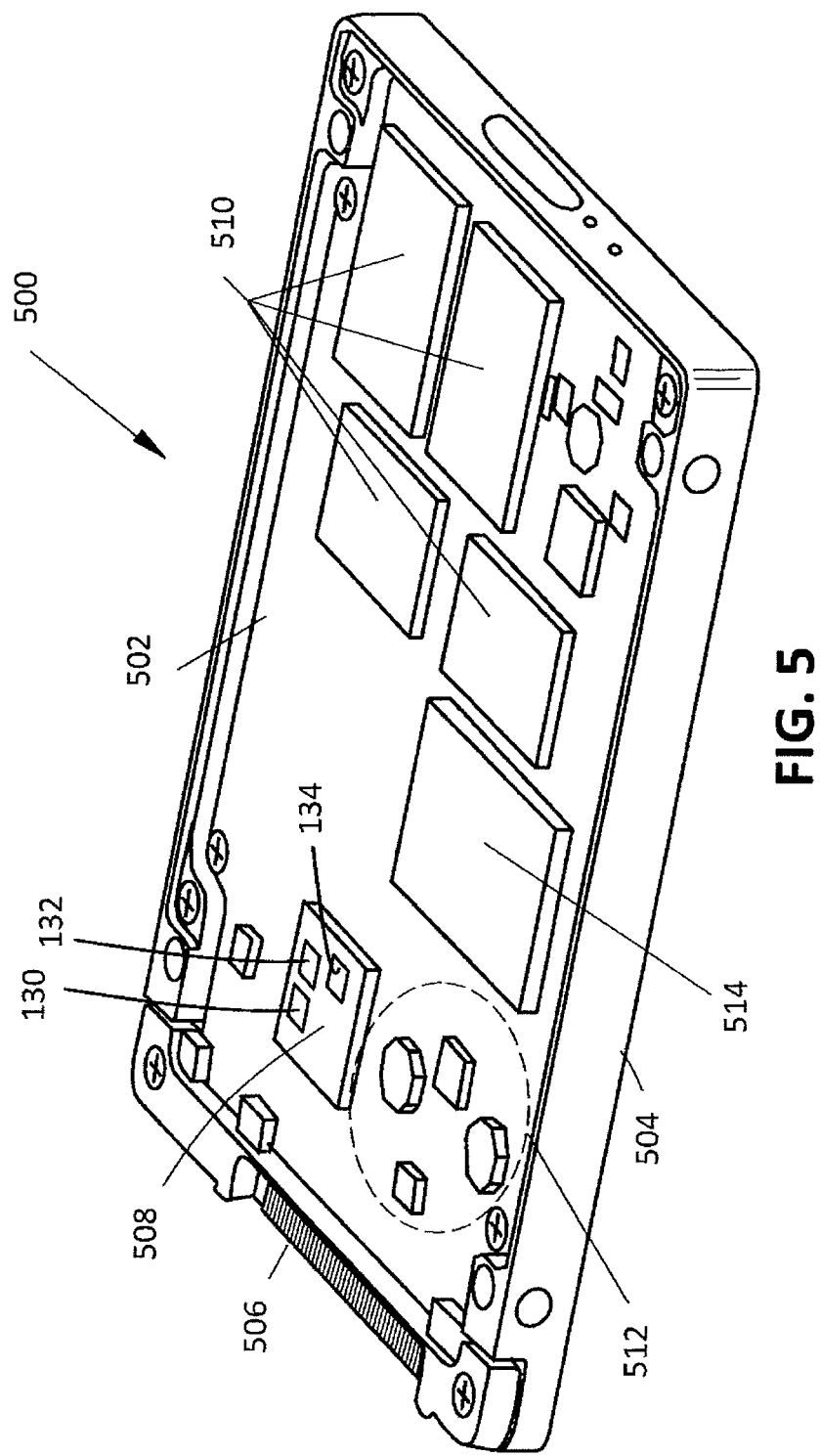
FIG. 5 is an isometric view of a solid-state drive that employs a method of reducing readying time in accordance with one embodiment.

FIG. 5 illustrates an oblique view of a solid state drive (SSD) 500 that employs a method of reducing readying time in accordance with one embodiment. SSD 500 includes one or more circuit card assemblies 502 and typically includes a protective, supportive housing 504, a top cover (not shown), and one or more interface connectors 506. SSD 500 further includes a controller ASIC 508, one or more non-volatile memory devices 510, and power regulation circuitry 512. The memory devices 510 are essentially the SSD's data storage media for the caches and main store. In some applications, SSD 500 further includes a power-backup energy storage device, such as a super-capacitor 514.

In accordance with certain aspects, the solid-state drive 500 includes a circuit card assembly 502 that includes a connector 506 for connection to a host computer. In accordance with certain aspects, the connector 506 includes a NVMe (non-volatile memory express), SCSI, SAS, FC-AL (fiber channel arbitrated loop), PCI-E (peripheral component interconnect express), IDE (integrated drive electronics), AT (advanced technology), ATA (advanced technology attachment), SATA, IEEE (institute of electrical and electronics engineers)-1394, USB or other interface connector adapted for connection to a host.

If, as shown in FIG. 5, more than one non-volatile memory device 510 is included in SSD 500, then one of the non-volatile memory devices 510 may be used as the first level cache. Physical storage locations (for example, erasure blocks) in the other one or more non-volatile memory devices 510 may be utilized as second level cache and as main storage locations. In other embodiments, physical storage locations in the one or more non-volatile memory devices 510 may serve a pool of physical bands for assignment to first level cache, second level cache and main storage. In SSD 500, controller ASIC 508 may include modules 130, 132 and 134 that operate in a manner described above. Further an event trigger log/event history log may be stored in a reserved area in one of non-volatile memory devices 510, and a new event buffer may be allocated in another one non-volatile memory device 510. In some embodiments, the reserved area having the event trigger log/event history stored therein and the new event buffer may be in different sections of a same memory.

In accordance with various embodiments, the methods described herein may be implemented as one or more software programs running on one or more computer processors or controllers, such as those included in devices 100, 400 and 500. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    a first memory section including a reserved area having stored therein an event trigger log comprising a history of past logged event data, the past logged event data comprising information generated in the data storage device in response to past events in the data storage device;
    a second memory section separate from the first memory section; and
    a controller configured to:
        upon power up of the data storage device and before the data storage device is ready to receive host commands, allocate a buffer in the second memory section for capturing new event data generated in response to new events in the data storage device; and
        postpone linking of any captured new event data with the past logged event data until at least after the data storage device is ready to receive the host commands.

2. The data storage device of claim 1 and wherein the controller is configured to link the captured new event data with the past logged event data when the data storage device enters into an idle state or in response to an event trigger log request from a host.

3. The data storage device of claim 1 and wherein the controller is configured to link the captured new event data with the past logged event data by loading the captured new event data with the past logged event data in the second memory section.

4. The data storage device of claim 1 and wherein the controller is configured to link the captured new event data with the past logged event data before a power down of the data storage device.

5. The data storage device of claim 1 and wherein the controller is configured to set a new event flag in the buffer upon storing initial event data or first event data in the buffer.

6. The data storage device of claim 5 and wherein, when the new events flag is set, the controller is configured to link the captured new event data with the past logged event data:
    when the data storage device enters into an idle state; or
    in response to an event trigger log request from a host; or
    before a power down of the data storage device.

7. The data storage device of claim 1 and wherein the first memory section is a part of a first memory and the second memory section is a part of a second memory that is of a different memory type than the first memory.

8. The data storage device of claim 7 and wherein the first memory is a data storage disc and wherein the second memory is a solid state memory.

9. A method comprising:
    storing, by a control circuit of a data storage device, an event trigger log comprising a history of past logged event data generated in the data storage device in response to past events in the data storage device in a reserved area included in a first memory section of the data storage device;
    upon power up of the data storage device and before the data storage device is ready to receive host commands, allocating a buffer in a second memory section, of the data storage device, for capturing new event data generated in response to new events in the data storage device; and
    postponing linking of any captured new event data with the past logged event data until at least after the data storage device is ready to receive the host commands.

10. The method of claim 9 and further comprising linking the captured new event data with the past logged event data when the data storage device enters into an idle state.

11. The method of claim 9 and further comprising linking the captured new event data with the past logged event data in response to an event trigger log request from a host.

12. The method of claim 9 and further comprising linking the captured new event data with the past logged event data before a power down of the data storage device.

13. The method of claim 9 and further comprising setting a new events flag in the buffer upon storing initial event data or first event data in the buffer.

14. The method of claim 13 and wherein, when the new event flag is set, linking the captured new event data with the past logged event data:
    when the data storage device enters into an idle state; or
    in response to an event trigger log request from a host; or
    before a power down of the data storage device.

15. The method of claim 9 and wherein the first memory section is a part of a first memory and the second memory section is a part of a second memory that is of a different memory type than the first memory.

16. The method of claim 15 and wherein the first memory is a data storage disc and wherein the second memory is a solid state memory.

17. A data storage device comprising:
    a system memory;
    a controller configured to:
        upon power-on reset of the data storage device and before the data storage device is ready to receive host commands, allocate a buffer in the system memory for capturing new event data generated in response to new events in the data storage device; and
    link any captured new event data with past logged event data after the data storage device is ready to receive the host commands, the past logged event data comprising information generated in the data storage device in response to past events in the data storage device.

18. The data storage device of claim 17 and wherein the controller is configured to link the captured new event data with the past logged event data when the data storage device enters into an idle state.

19. The data storage device of claim 17 and wherein the controller is configured to link the captured new event data with the past logged event data in response to an event trigger log request from a host.

20. The data storage device of claim 17 and wherein the controller is configured to link the captured new event data with the past logged event data before a power down of the data storage device.

* * * * *